United States Patent

Menkhoff

(10) Patent No.: US 10,455,511 B2
(45) Date of Patent: Oct. 22, 2019

(54) WIRELESS CIRCUITRY WITH SCALABLE ACCURACY

(71) Applicant: Intel IP Corporation, Santa Clara, CA (US)

(72) Inventor: Andreas Menkhoff, Oberhaching (DE)

(73) Assignee: Intel IP Corporation, Santa Clara, CA (US)

( * ) Notice: Subject to any disclaimer, the term of this patent is extended or adjusted under 35 U.S.C. 154(b) by 872 days.

(21) Appl. No.: 14/872,015

(22) Filed: Sep. 30, 2015

(65) Prior Publication Data

US 2017/0094606 A1 Mar. 30, 2017

(51) Int. Cl.
*H04W 52/02* (2009.01)
*H04W 52/32* (2009.01)

(52) U.S. Cl.
CPC ..... *H04W 52/0287* (2013.01); *H04W 52/028* (2013.01); *H04W 52/0209* (2013.01); *H04W 52/0229* (2013.01); *H04W 52/32* (2013.01); *Y02D 70/00* (2018.01); *Y02D 70/1242* (2018.01); *Y02D 70/1262* (2018.01); *Y02D 70/142* (2018.01); *Y02D 70/144* (2018.01); *Y02D 70/166* (2018.01)

(58) Field of Classification Search
CPC ..... G06F 1/06; G06F 13/4243; H03L 7/0802; H04W 72/04; H04W 52/0209; H04W 52/0287; H04W 52/32; H04L 1/0006; H04B 15/06; H04J 3/167
See application file for complete search history.

(56) References Cited

U.S. PATENT DOCUMENTS

| | | | |
|---|---|---|---|
| 6,583,657 B1 | 6/2003 | Eckhardt et al. | |
| 8,238,365 B2 * | 8/2012 | Zhao | H04J 3/167 370/466 |
| 2005/0042996 A1 * | 2/2005 | Khlat | H03L 7/0802 455/255 |
| 2006/0242446 A1 * | 10/2006 | Hanamori | G06F 1/06 713/500 |
| 2009/0150710 A1 * | 6/2009 | Bilger | G06F 13/4243 713/600 |
| 2010/0195586 A1 | 8/2010 | Choi et al. | |
| 2013/0250886 A1 * | 9/2013 | Zhou | H04L 1/0026 370/329 |
| 2014/0010168 A1 * | 1/2014 | Stapleton | H04W 72/04 370/329 |
| 2014/0148111 A1 * | 5/2014 | Yu | H04B 15/06 455/192.2 |
| 2015/0071239 A1 * | 3/2015 | Zhang | H04L 1/0006 370/329 |
| 2015/0117396 A1 | 4/2015 | Wang et al. | |

OTHER PUBLICATIONS

International Search Report dated Oct. 27, 2016 for PCT International Application No. PCT/US16/48631.

* cited by examiner

Primary Examiner — Vinncelas Louis
(74) Attorney, Agent, or Firm — Schiff Hardin LLP (57) ABSTRACT

Described herein are architectures, platforms and methods for implementing scalable power in a wireless device. Multiple radio access technology architectures running different operating clock frequencies are supported by providing a scaled static clock frequency and dynamic clock frequencies by dynamically switching parallel paths of processing resources.

19 Claims, 5 Drawing Sheets

WIRELESS CIRCUITRY WITH SCALABLE ACCURACY

BACKGROUND

In wireless devices, there can be multiple radio architectures, or radio access technologies (RAT). Example standards that may be supported on a wireless device, include Universal Mobile Telecommunication System (UMTS) $3^{rd}$ Generation (3G), Long Term Evolution (LTE) 4, LTE 10 and LTE 20. Each architecture or standard operates in particular bandwidths, and has particular resource and power (current) requirements as to receiving and transmitting.

A wireless device with multiple RATs, may have to support the different bandwidth requirements of each RAT. In particular, radio frequency (RF) transmitters, receivers, transceivers, and modems of the wireless device may have to support different bandwidths. For example, transmission bandwidth for UMTS 3G may be 1.5 MHz wide and LTE 20 may have a 38 MHz bandwidth.

As bandwidth increase, the power and resource requirements also increase. For wireless devices, physical resource blocks (PRB). PRB are groups of transport carriers (e.g. sub-carriers) or intervals that are assigned to transport data. For example, a wireless device with multiple RATs, may include an architecture with LTE 20. The LTE 20 architecture may be allocated 100 PRBs. Other collocated RATs on the wireless device (e.g., UMTS 3G, LTE 10) may operate at lower bandwidths and lower power. These collocated RATs require less PRBs. Furthermore, although LTE 20 may be allocated 100 PRBs, typically only a fractional portion of the 100 PRBs are actually used. For example, in LTE 20 transmission may only 25 PRBs are used, which is the maximum number used by LTE 5. These instances exist, such as in frequency domain division where multiple users operate at the same band. In certain instances, a acknowledge signal is sent requiring nominal PRBs. The use of fewer PRBs also has advantageous in signal to noise ratio (SNR). The PRBs that are used divide the output power. Therefore, with output power remaining constant (i.e., full output power), the fewer the PRBs, the more power for each PRB, thus increasing SNR for each PRB.

Accuracy is related to power (output power), current usage, and bandwidth. In particular, accuracy is related operating clock frequency supporting particular RATs/standards. Operating clock frequency at a wireless device may be adjusted per RAT/standard.

As such, there is a need to provide efficient power consumption and communication in multi RAT wireless devices.

BRIEF DESCRIPTION OF THE DRAWINGS

The detailed description is described with reference to accompanying figures. In the figures, the left-most digit(s) of a reference number identifies the figure in which the reference number first appears. The same numbers are used throughout the drawings to reference like features and components.

DETAILED DESCRIPTION

Figure 1:
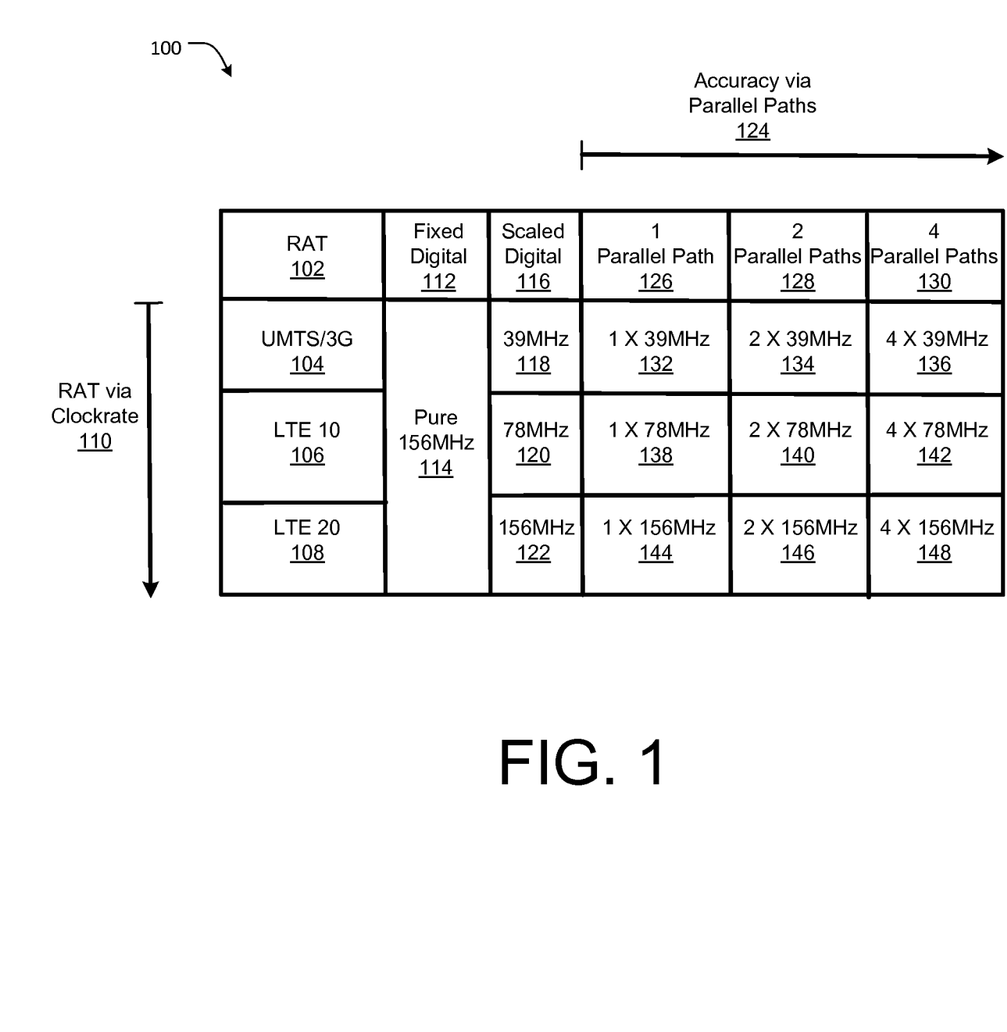
FIG. 1 is an example table illustrating scaling clock rate by using parallel paths of processing resources as described in implementations herein.

FIG. 1 shows a table 100 that provides for a scalable clock by using parallel paths as described herein. A widely scalable clock provided for the hardware of a multi radio access technology (RAT) wireless device, allows adjusting the performance of the hardware as to the actual needed accuracy, leading to greater power and communication efficiencies.

In this example, column RAT 102, lists UMTS/3G 104, LTE 10 106 and LTE 20 108. Comparison of the different RATs by clock rate is represented by "RAT via clock rate" 110.

For RATs, there is static clock frequency. Each RAT has a maximum clock frequency. Certain RAT/standards operate at lower or higher clock frequencies. In the case of UMTS/3G or LTE 5, maximum performance can be achieved by one quarter of the clock frequency need for LTE 20. In this example, a Fixed Digital 112 clock frequency is set at 156 MHz 114, which is the maximum clock frequency for LTE 20 108. The 156 MHz clock frequency can be scaled as represented by "Scaled Digital" 116. For UMTS/3G 104, the scaled clock is set to the maximum clock frequency 39 MHz 118. For LTE 10 104, the scaled clock is set to the maximum clock frequency 78 MHz 118. For LTE 20 108, the scaled clock is set to the maximum clock frequency 156 MHz 122. The Scaled Digital 116 clocks are considered static clocks at which the respective RATs operate.

In certain instances, a particular RAT needs a higher clock frequency to operate. In particular, greater accuracy may require a higher clock frequency. To achieve the particular clock frequency, parallel paths of processing resources may be switched on/off. The parallel paths of processing resources are further described below. Accuracy and number of parallel paths of resources is represented by "Accuracy via Parallel Paths" 124.

In this example, and further discussed below, the number of parallel paths can be switched on/off. To achieve particular clock frequencies, there can be 1, 2 or 4 parallel paths, as represented by "1 Parallel Path" 126, "2 Parallel Path" 128, and "4 Parallel Path" 130. For UMTS/3G 104: if there is 1 parallel path turned on, there is a clock frequency of 1×39 MHz (39 MHz) 132; if there are 2 parallel paths turned on, there is a clock frequency of 2×39 MHz (78 MHz) 134; and if there are 4 parallel paths turned on, there is a clock frequency of 4×39 MHz (156 MHz) 136. For LTE 10 106: if there is 1 parallel path turned on, there is a clock frequency of 1×78 MHz (78 MHz) 138; if there are 2 parallel paths turned on, there is a clock frequency of 2×78 MHz (156 MHz) 140; and if there are 4 parallel paths turned on, there is a clock frequency of 4×78 MHz (312 MHz) 142. For LTE 20 108: if there is 1 parallel path turned on, there is a clock frequency of 1×156 MHz (156 MHz) 144; if there are 2 parallel paths turned on, there is a clock frequency of 2×156 MHz (312 MHz) 146; and if there are 4 parallel paths turned on, there is a clock frequency of 4×156 MHz (624 MHz)

148. Therefore, depending on accuracy, a clock frequency can be dynamically adjusted from 39 MHz to 624 MHz, a 1 to 16 ratio.

In certain implementations, the scaled digital clock, Scaled Digital" 116, may be extended to 19.5 MHZ for LTE 3 and 9.75 MHz for LTE 1.4 or up to 312 MHz for two times LTE 20 in a carrier aggregation mode. In such an implementation, there would be 6 scaled digital frequencies and 1, 2, 3, or 4 parallel paths (4 parallel paths total), achieving a 1:24 clock ratio. Furthermore, with 6 scaled digital frequencies, and 1, 2, 3, 4, 5, 6, 7, or 8 parallel paths (8 parallel paths total), it is possible to achieve a 1:48 clock ratio.

By determining and adjusting the clock frequency, efficiency can be realized in power, current and resource usage. In other words, determination of the needed accuracy determines a particular clock frequency which is dynamically adjusted. Lower accuracy (lower clock) leading to lower power/current use.

Figure 2:
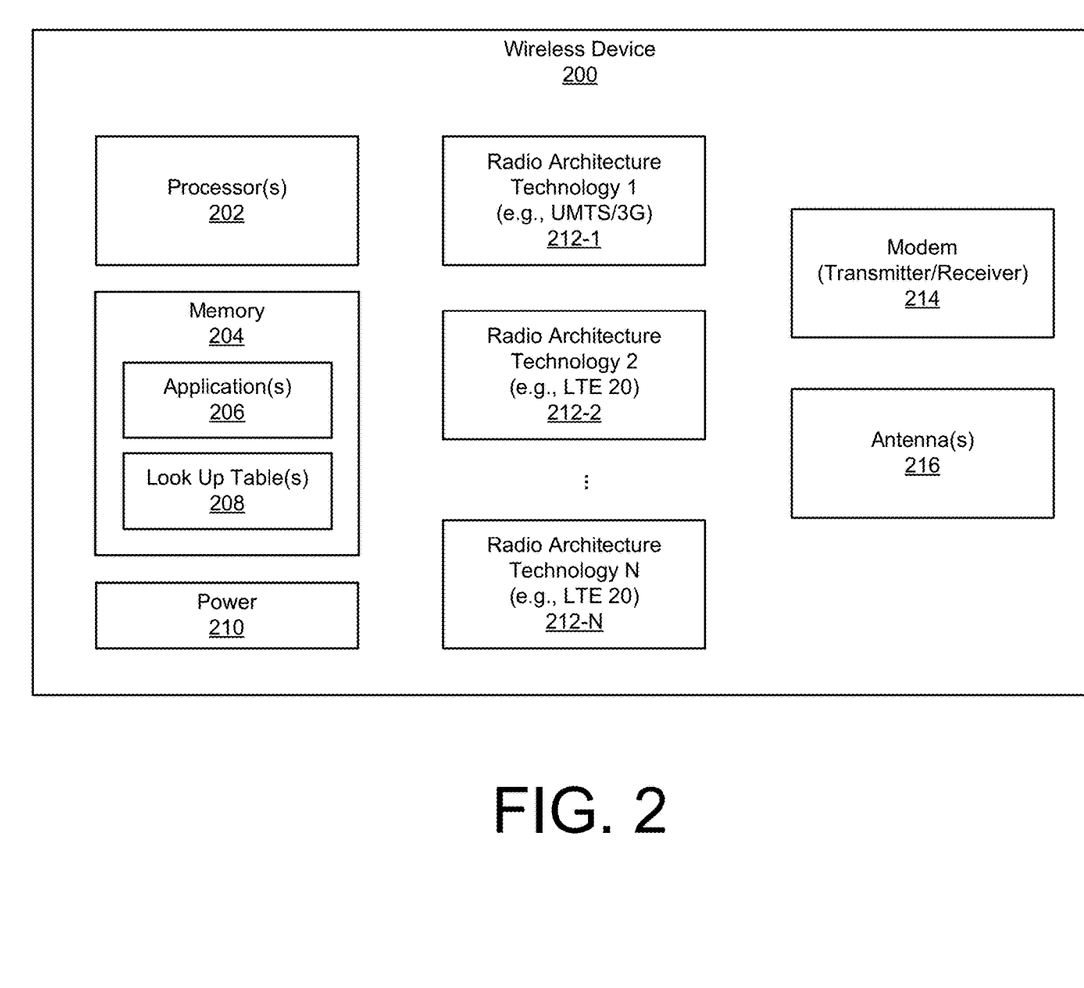
FIG. 2 is an example block diagram of a wireless device implementing scalable accuracy as described in implementations herein.

FIG. 2 shows an example wireless device 200 described in present implementations herein. The wireless device 200 may include, but is not limited to, a tablet computer, a netbook, a notebook computer, a laptop computer, mobile phone, a cellular phone, a smartphone, a personal digital assistant, a multimedia playback device, a digital music player, a digital video player, a navigational device, a digital camera, and the like.

The wireless device 200 may include one or more processors 202, and a memory 204 coupled to the one or more processors 202. Memory 204 may be a non-transitory memory/media that includes various types of storage, including read only, random access and the like. Memory 204 may also include programming/non-programmable firmware. Particular elements described herein as hardware may be implemented in firmware as part of memory 204. Memory 204 may particularly include applications 206 which may be communication/wireless/RF related communications. Memory 204 may also include look up table(s) 208. Look up tables may be used to determine relationship of particular RATs/standards, bandwidth requirement(s), operating frequency(ies) (clock), accuracy, and which the number of parallel paths to turn on/off.

The wireless device 200 may include a power component 210. The power component 210 may include various AC and/or DC elements, such as batteries. Furthermore, the power component 210 drives and provides power to various other components of wireless device 200.

The wireless device 200 includes one or more RAT architectures which allow wireless communication in various standards. In this example Radio Architecture Technology 1 represented as 212-1 can be UMTS/3G; Radio Architecture Technology 2 represented as 212-2 can be LTE 10; and Radio Architecture Technology N represented as 212-N can be LTE 20.

The wireless device 200 includes a modem (transmitter/receiver/transceiver) 214 that receives/transmits signals/data that implementing a static clock (scaled), and a dynamic clock. The modem 214 may be multiplexed to be used for the different RATs 212. The dynamic clock provides varying clock frequency depending on accuracy needs/requirements. Parallel paths are either switched on or off, depending on the clock frequency that is needed. At least one parallel path is turned on to provide basic functionality.

As discussed, physical resource blocks (PRBs) used, are determinative of the bandwidth of the particular RAT/standard. In particular, a PRB may be treated as a particular quantization step. For example, LTE 20 may make use at the maximum 100 PRBs or quantization steps. Other RAT/standards may make use of fewer PRBs or quantization step. The wireless device 200 accounts for the greatest number of PRBs that may possibly be needed. In other words, the RAT/standard requiring the greatest number of PRBs is accounted.

Wireless device 200 further includes one or more antenna(s) 216 to transmit and receive signals/data.

Figure 3:
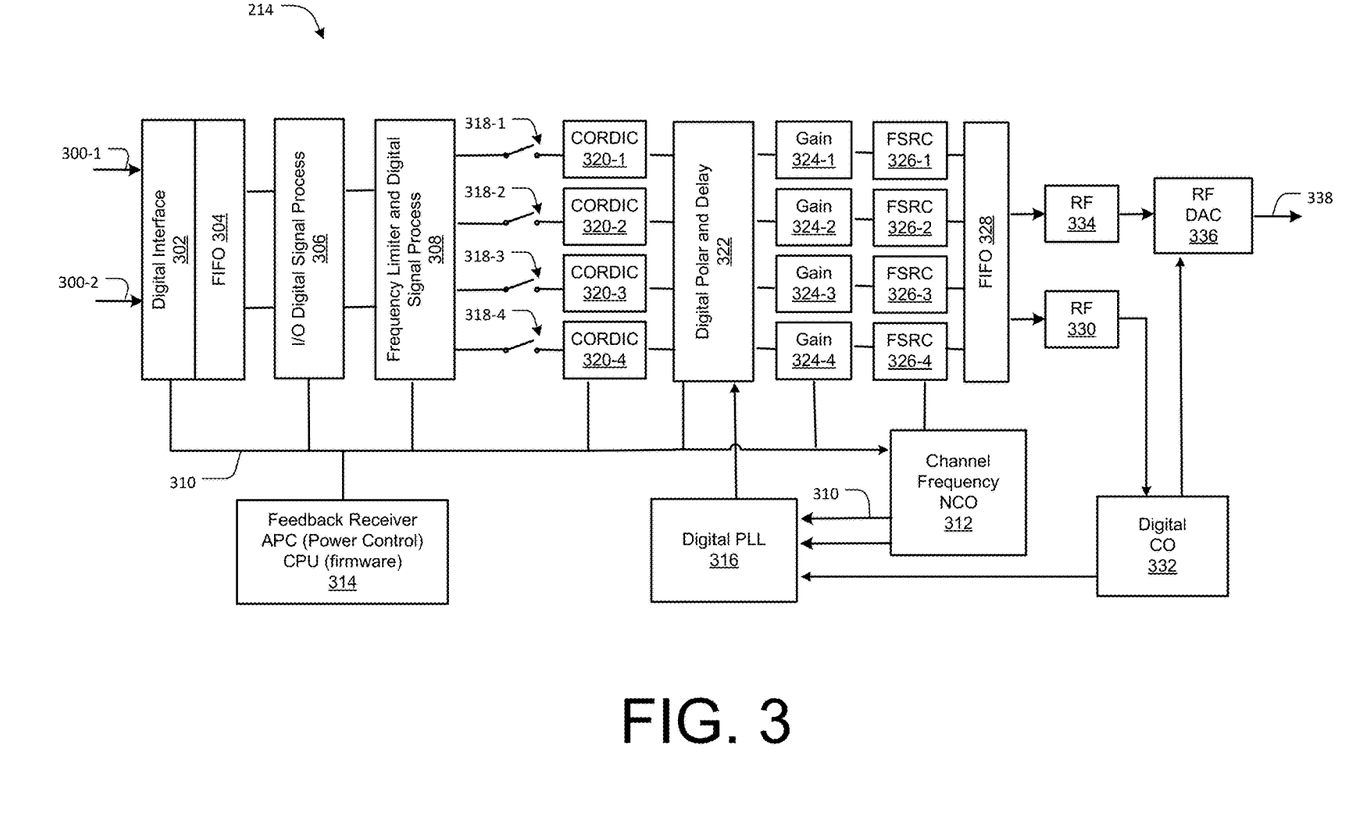
FIG. 3 is an example block diagram of a modem/transmitter for a scalable accuracy as described in implementations herein.

FIG. 3 shows an example modem 214 architecture as described in present implementations herein. The architecture 214 represents an example implementation of a transmitter; however, it is to be understood that the concepts described may apply to receivers and transceivers. As discussed, there may be a single modem 214 that supports multiple RATs 212. In other implementations, more than one modem may be used for a device (e.g, wireless device 200). Architecture 214 supports multiple RATs, and particular data to be transmitted from different RATs.

The components that are described as to architecture 214 are an example implementation, and it is to be understood that other components may be substituted, certain components omitted in the example architecture 214, etc.

As discussed above, depending on the RAT architecture there is a static clock frequency which is a scaled clock frequency, and a dynamically scaled clock frequency which affects particular components. In particular, as to architecture 214, certain components operate at a static scaled clock frequency, at a dynamically scaled clock frequency, and a separate (not scaled) clock frequency.

Digital data or signals 300 are received from a particular RAT by a digital interface 302. A FIFO interface 304 orders the data and passes the data to a I/O digital processor 306. The I/Q digital processor 306 provides processed data (magnitude and phase of the signal) to a Frequency Limiter and Digital Signal Processor 308. Control signals as represented by line 310 are passed to a Channel Frequency Numerically Controlled Oscillator 312 from the digital interface 302, I/Q digital processor 306, Frequency Limiter and Digital Signal Processor 308. A feedback receiver 314 provides and receives control signal 310, and particularly provides control for an auxiliary power control and central processing unit(s) (e.g., processors 202). The Channel Frequency Numerically Controlled Oscillator 312 further provides control signals 310 and data to a digital phase lock loop 316.

As discussed certain components run on a separate clock frequency. In this example implementation, the digital phase lock loop 316, feedback receiver 314, and I/Q digital processor 306 run on a clock frequency that is not scaled, independent of any particular RAT/standard. The Frequency Limiter and Digital Signal Processor 308 and Channel Frequency Numerically Controlled Oscillator 312 operate on a scaled clock that is dependent on which RAT/standard is being implemented.

Dynamic clocking frequency to support the multiple RATs can be performed using four scaled parallel paths. In this example the parallel paths are switched on/off by respective switches 318-1, 318-2, 318-3 and 318-4. Each parallel path has a respective coordinate rotational digital component or CORDIC 320-1, 320-2, 320-3, and 320-4. Each CORDIC passes data to a Digital Polarizer and Delay 322. The Digital Polarizer and Delay 322 passes data to respective gain components 324-1, 324-2, 324-3, and 324-4. From the gain components 324, respective fractional sample rate converters or FSRC 326-1, 326-2, 326-3 and 326-4 receive data. A FIFO interface 328 orders the data from the FSRC 326. A RF filter 330 receives the data and passes it on to a digital control oscillator or DCO 332, which provides the data to the digital phase lock loop 316. Another RF filter 334 provides data to RF digital to analog converter (DAC) 336, which transmits a modulated RF data signal 338.

In this example, the four scaled parallel paths includes parallel path 1 connected by toggled on/off by switch 318-1, connected to CORDIC 320-1, connected to Digital Polarizer and Delay 322, connected to gain component 324-1, connected to FSRC 326-1, and connected to FIFO interface 328. Similarly, parallel paths 2, 3, and 4 include respective components as are included in parallel path 1. Switches 318 are turned on/off to provide needed accuracy. One parallel path is always turned on to provide basic functionality. The other three parallel are turned on to provide increased performance or clock frequency as discussed above as to FIG. 2.

As to operation, the switching parallel paths "off" is relatively instantaneous. When switching parallel paths "on," some settling time may be needed. Therefore, settling time when switching parallel paths "on" should be taken into consideration before output samples (data) may be used for a higher accuracy output signal.

Received data or data signal at the digital interface 302 can indicate a particular RAT that is implemented, how many PRBs to allocate, band/frequency, output power and signaling values. Accuracy needed is related to the dynamic clocking and the desired dynamic clock frequency. Accuracy can be related to bandwidth of the data signal; end and beginning of resource block; output of the device; band used to transmit; and signal values.

Figure 4:
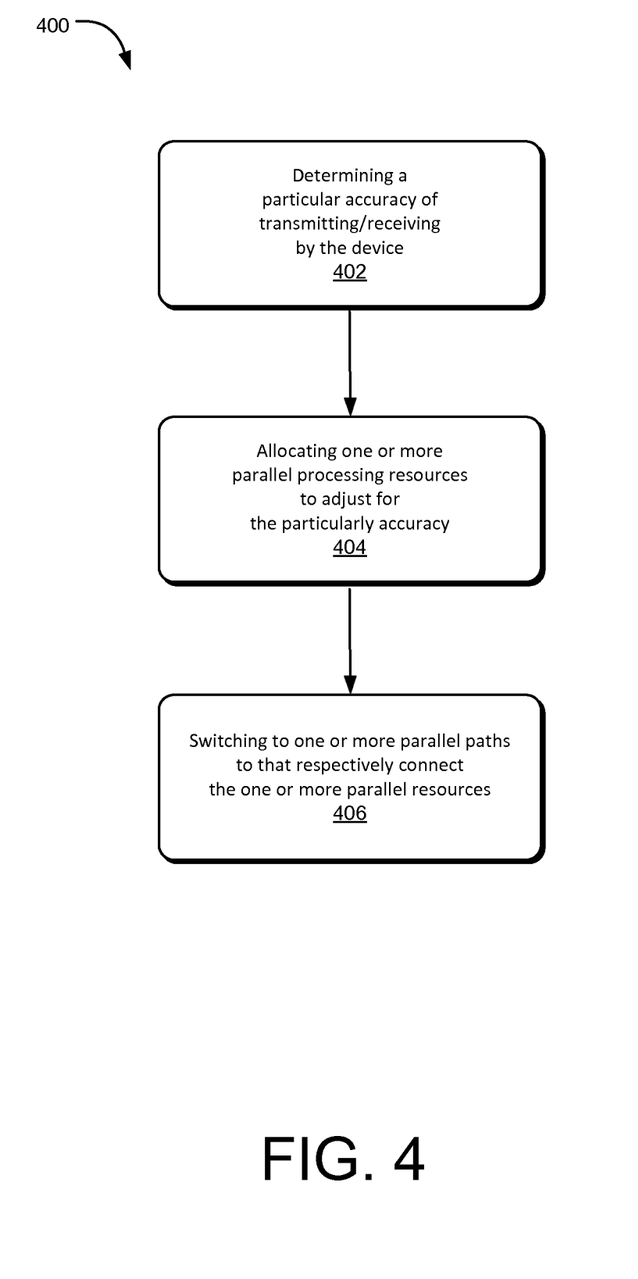
FIG. 4 is an example flow chart illustrating an example method for scalable power as described in implementations herein.

FIG. 4 shows an example process chart 400 illustrating an example method for scalable accuracy as described in implementations herein. For example, different RATs exist in a wireless device, and different clock frequencies are used for different accuracy. Power is scaled based on the different clock frequencies. Therefore a determination is made as to clock frequency which relates to scalable power. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 402, determining a particular accuracy for transmitting or receiving is performed. The particular accuracy relates to a particularly clock frequency which may be based on static scaled clock. A determination may be made as to a lower bandwidth operation for a wireless device providing a lower static frequency for the static clock and a determination of a higher bandwidth operation for the wireless device provides a higher static frequency for the static clock. Adjusting the clock frequency may also be based on a dynamic clock.

At block 404, allocating one or more parallel processing resources to adjust for a particular accuracy is performed. The allocating may be based on a received digital data. The digital data may be considered as a signal having a particular bandwidth, where the bandwidth has a lower band frequency and a higher band frequency.

A data signal may be allocated a certain bandwidth. The bandwidth having higher and lower band frequencies. The gap between the higher and lower frequencies requires different numbers of PRBs or quantization steps. Accuracy may be adjusted to account for the gap.

At block 406, switching to one or more parallel paths that respectively connect to the one or more parallel resources is performed. The parallel paths provide a range of clocking frequencies that support the different RAT architectures and particularly operations using specific RAT architecture.

Figure 5:
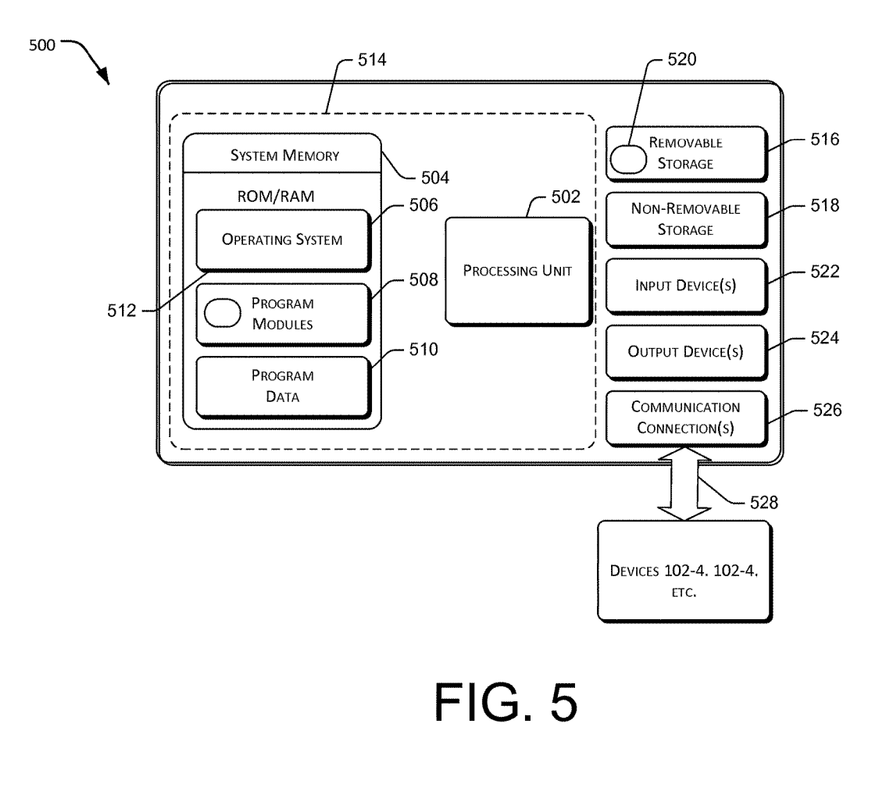
FIG. 5 is a diagram example system for a scalable accuracy as described in implementations herein.

FIG. 5 is an example system that may be utilized to implement various described embodiments. However, it will be readily appreciated that the techniques disclosed herein may be implemented in other computing devices, systems, and environments. The computing device 500 shown in FIG. 5 is one example of a computing device and is not intended to suggest any limitation as to the scope of use or functionality of the computer and network architectures.

In at least one implementation, computing device 500 typically includes at least one processing unit 502 and system memory 504. Depending on the exact configuration and type of computing device, system memory 504 may be volatile (such as RAM), non-volatile (such as ROM, flash memory, etc.) or some combination thereof. System memory 504 may include an operating system 506, one or more program modules 508 that implement the long delay echo algorithm, and may include program data 510. A basic implementation of the computing device 500 is demarcated by a dashed line 514.

The program module 508 may include a module 512 configured to implement the one-tap connection and synchronization scheme as described above. For example, the module 512 may carry out one or more of the method 500, and variations thereof, e.g., the computing device 500 acting as described above with respect to the device 200.

Computing device 500 may have additional features or functionality. For example, computing device 500 may also include additional data storage devices such as removable storage 516 and non-removable storage 518. In certain implementations, the removable storage 516 and non-removable storage 518 are an example of computer accessible media for storing instructions that are executable by the processing unit 502 to perform the various functions described above. Generally, any of the functions described with reference to the figures may be implemented using software, hardware (e.g., fixed logic circuitry) or a combination of these implementations. Program code may be stored in one or more computer accessible media or other computer-readable storage devices. Thus, the processes and components described herein may be implemented by a computer program product. As mentioned above, computer accessible media includes volatile and non-volatile, removable and non-removable media implemented in any method or technology for storage of information, such as computer readable instructions, data structures, program modules, or other data. The terms "computer accessible medium" and "computer accessible media" refer to non-transitory storage devices and include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium that may be used to store information for access by a computing device, e.g., computing device 500 and wireless mobile device 200. Any of such computer accessible media may be part of the computing device 500.

In one implementation, the removable storage 516, which is a computer accessible medium, has a set of instructions 530 stored thereon. When executed by the processing unit 502, the set of instructions 530 cause the processing unit 502 to execute operations, tasks, functions and/or methods as described above, including method 500 and any variations thereof.

Computing device 500 may also include one or more input devices 520 such as keyboard, mouse, pen, voice input device, touch input device, etc. Computing device 500 may additionally include one or more output devices 522 such as a display, speakers, printer, etc.

Computing device 500 may also include one or more communication connections 524 that allow the computing device 500 to communicate wirelessly with one or more other wireless devices, over wireless connection 528 based on near field communication (NFC), Wi-Fi, Bluetooth, radio frequency (RF), infrared, or a combination thereof.

It is appreciated that the illustrated computing device 500 is one example of a suitable device and is not intended to suggest any limitation as to the scope of use or functionality of the various embodiments described.

Unless the context indicates otherwise, the term "Universal Resource Identifier" as used herein includes any identifier, including a GUID, serial number, or the like.

In the above description of example implementations, for purposes of explanation, specific numbers, materials configurations, and other details are set forth in order to better explain the present invention, as claimed. However, it will be apparent to one skilled in the art that the claimed invention may be practiced using different details than the example ones described herein. In other instances, well-known features are omitted or simplified to clarify the description of the example implementations.

The inventors intend the described example implementations to be primarily examples. The inventors do not intend these example implementations to limit the scope of the appended claims. Rather, the inventors have contemplated that the claimed invention might also be embodied and implemented in other ways, in conjunction with other present or future technologies.

Moreover, the word "example" is used herein to mean serving as an example, instance, or illustration. Any aspect or design described herein as "example" is not necessarily to be construed as preferred or advantageous over other aspects or designs. Rather, use of the word example is intended to present concepts and techniques in a concrete fashion. The term "techniques", for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more", unless specified otherwise or clear from context to be directed to a singular form.

These processes are illustrated as a collection of blocks in a logical flow graph, which represents a sequence of operations that may be implemented in mechanics alone or a combination with hardware, software, and/or firmware. In the context of software/firmware, the blocks represent instructions stored on one or more computer-readable storage media that, when executed by one or more processors, perform the recited operations.

Note that the order in which the processes are described is not intended to be construed as a limitation, and any number of the described process blocks may be combined in any order to implement the processes or an alternate process. Additionally, individual blocks may be deleted from the processes without departing from the spirit and scope of the subject matter described herein.

The term "computer-readable media" includes computer-storage media. In one embodiment, computer-readable media is non-transitory. For example, computer-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

Unless the context indicates otherwise, the term "logic" used herein includes hardware, software, firmware, circuitry, logic circuitry, integrated circuitry, other electronic components and/or a combination thereof that is suitable to perform the functions described for that logic.

The following examples pertain to further embodiments:

Example 1 is a method of adjusting clock frequency in a transmitting or receiving device comprising: determining a particular accuracy of transmitting or receiving by the device; allocating one or more parallel resources to adjust for the particular accuracy; and switching to one or more parallel paths to respectively connect the one or more parallel resources to process data signals based on the particular accuracy.

In example 2, the method of example 1, wherein the adjusting clock frequency is based on a static clock.

In example 3, the method of example 2, further comprises: determining a lower bandwidth of operation for the device to generate a lower static frequency for the static clock, and determining a higher bandwidth operation for the device to generate a higher static frequency for the static clock.

In example 4, the method of example 1, wherein the adjusting clock frequency is based on a dynamic clock.

In example 5, the method of example 1, wherein the allocating one or more parallel resources is based on a received data signal.

In example 6, the method of any of examples 1 to 5, wherein determining the particular accuracy is based on one or more of the following: bandwidth of a received data signal; end and beginning of bandwidth of the data signal; gap between several bandwidth allocations needed by the data signal; output power of the device; band used to transmit from the device; and data signal values.

Example 7 is a modem device comprising: an interface configured to receive a data signal from a radio access technology; a scaled static clock configured to support the radio access technology; and a plurality of parallel paths for processing resources that are dynamically switched on or off to generate a particular clock frequency supporting the radio access technology.

In example 8, the device of example 7, wherein the data signal determines an accuracy.

In example 9, the device of example 8, wherein the accuracy is related to the particular clock frequency provided by the parallel paths that are dynamically switched on or off.

In example 10, the device of example 7, wherein the scaled static clock is configured from a lower bandwidth operation at a lower static frequency and higher bandwidth operation at a higher static frequency.

In example 11, the device of example 7, wherein accuracy is related to number of physical resource blocks that are allocated to support communication for the radio access technology.

In example 12, the device of example 7, wherein accuracy is related to one or more of the following: bandwidth of the data signal; end and beginning of resource block; output of the device; band used to transmit; gap between resource block allocations and data signal values.

In example 13, the device of any of examples 7 to 12, wherein the plurality of parallel paths for processing resources are configured to perform digital operations on the received data signal.

Example 14 is a wireless device comprising: one or more processors; memory coupled to the processors, wherein the memory comprises one or more lookup tables; a modem coupled to the processors and memory, wherein the memory comprising a scaled static clock and parallel paths of resources that are dynamically switched on and off to provide particular operating frequencies to support multiple radio access technologies located on the wireless device.

In example 15, the wireless device of example 14, wherein the lookup tables determine which radio access technologies, band requirements, operating frequencies and which parallel paths of resources to switch on.

In example 16, the wireless device of example 15, wherein band requirements include lower frequency and upper frequency of received data signals.

In example 17, the wireless device of example 14, wherein the lookup tables relate an accuracy with one or more of the following: bandwidth of a data signal; end and beginning of bandwidth of the data signal; gap between several bandwidth allocations needed by the data signal; output power of the wireless device; band frequency used to transmit; and data signal values.

In example 18, the wireless device of example 14, wherein the parallel paths of resources that are dynamically switched on and off to provide particular operating frequencies are related to a dynamic clock.

In example 19, the wireless device of example 14, wherein the parallel paths of resources that are dynamically switched on and off are related to received data signals.

In example 20, the wireless device of any of examples 14 to 19, wherein received data signals determine quantization steps and the parallel paths of resources that are dynamically switched on and off are related to the quantization steps.

What is claimed is:

1. A method of adjusting clock frequency in a transmitting or receiving device comprising:
   determining a particular accuracy of transmitting or receiving by the device;
   allocating one or more parallel processing resources to adjust for the particular accuracy; and
   dynamically switching one or more parallel paths on or off to respectively connect the one or more parallel processing resources to process data signals based on the particular accuracy, the data signals being indicative of at least one quantization step, and the dynamic switching of the one or more parallel paths being related to the at least one quantization step.

2. The method of claim 1, wherein the adjusting clock frequency is based on a static clock.

3. The method of claim 2, further comprises:
   determining a lower bandwidth of operation for the device to generate a lower static frequency for the static clock, and determining a higher bandwidth operation for the device to generate a higher static frequency for the static clock.

4. The method of claim 1, wherein the adjusting clock frequency is based on a dynamic clock.

5. The method of claim 1, wherein the allocating one or more parallel processing resources is based on a received data signal.

6. The method of claim 1, wherein determining the particular accuracy is based on one or more of the following:
   bandwidth of a received data signal;
   end and beginning of bandwidth of the data signal;
   gap between several bandwidth allocations needed by the data signal;
   output power of the device;
   band used to transmit from the device; and
   data signal values.

7. A modem device comprising:
   an interface configured to receive a data signal from a radio access technology;
   a scaled static clock configured to support the radio access technology; and
   a plurality of parallel paths for processing resources that are dynamically switched on or off to generate a particular clock frequency supporting the radio access technology, the received data signal being indicative of at least one quantization step, and the dynamic switching of the plurality of parallel paths being related to the at least one quantization step.

8. The device of claim 7, wherein the received data signal determines an accuracy.

9. The device of claim 8, wherein the accuracy is related to the particular clock frequency provided by the parallel paths that are dynamically switched on or off.

10. The device of claim 7, wherein the scaled static clock is configured from a lower bandwidth operation at a lower static frequency and higher bandwidth operation at a higher static frequency.

11. The device of claim 7, wherein accuracy is related to number of physical resource blocks that are allocated to support communication for the radio access technology.

12. The device of claim 7, wherein accuracy is related to one or more of the following: bandwidth of the data signal; end and beginning of resource block; output of the device; band used to transmit; gap between resource block allocations and data signal values.

13. The device of claim 7, wherein the plurality of parallel paths for processing resources are configured to perform digital operations on the received data signal.

14. A wireless device comprising:
    one or more processors;
    memory coupled to the processors, wherein the memory comprises one or more lookup tables;
    a modem coupled to the processors and memory, wherein the memory comprising a scaled static clock and parallel paths of resources that are dynamically switched on and off to provide particular operating frequencies to support multiple radio access technologies located on the wireless device,
    wherein received data signals determine quantization steps, and
    wherein the parallel paths of the resources that are dynamically switched on and off are related to the quantization steps.

15. The wireless device of claim 14, wherein the lookup tables determine which radio access technologies, band requirements, operating frequencies and which parallel paths of resources to switch on.

16. The wireless device of claim 15, wherein band requirements include lower frequency and upper frequency of received data signals.

17. The wireless device of claim 14, wherein the lookup tables relate an accuracy with one or more of the following: bandwidth of a data signal; end and beginning of bandwidth of the data signal; gap between several bandwidth allocations needed by the data signal; output power of the wireless device; band frequency used to transmit; and data signal values.

18. The wireless device of claim 14, wherein the parallel paths of resources that are dynamically switched on and off to provide particular operating frequencies are related to a dynamic clock.

19. The wireless device of claim 14, wherein the parallel paths of resources that are dynamically switched on and off are related to received data signals.

\* \* \* \* \*